(12) United States Patent
Yu et al.

(10) Patent No.: US 11,770,199 B2
(45) Date of Patent: Sep. 26, 2023

(54) TRAFFIC DATA SELF-RECOVERY PROCESSING METHOD, READABLE STORAGE MEDIUM, SERVER AND APPARATUS

(71) Applicant: PING AN TECHNOLOGY (SHENZHEN) CO., LTD., Guangdong (CN)

(72) Inventors: Liangling Yu, Shenzhen (CN); Congjian Dai, Shenzhen (CN); Huangwei Fang, Shenzhen (CN); Weiwei Ye, Shenzhen (CN); Xiaohua Li, Shenzhen (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 706 days.

(21) Appl. No.: 16/095,344

(22) PCT Filed: Feb. 26, 2018

(86) PCT No.: PCT/CN2018/077241
§ 371 (c)(1),
(2) Date: Apr. 20, 2021

(87) PCT Pub. No.: WO2018/227997
PCT Pub. Date: Dec. 20, 2018

(65) Prior Publication Data
US 2021/0271555 A1   Sep. 2, 2021

(30) Foreign Application Priority Data

Jun. 16, 2017   (CN) .......................... 201710457222.X

(51) Int. Cl.
*H04J 3/06*   (2006.01)
*G06F 11/14*   (2006.01)
(Continued)

(52) U.S. Cl.
CPC ............ *H04J 3/06* (2013.01); *G06F 11/1443* (2013.01); *H04B 17/318* (2015.01); *H04L 43/04* (2013.01); *G06F 2201/805* (2013.01)

(58) Field of Classification Search
CPC ...... H04J 3/06; H04B 17/318; H04W 56/001; H04W 56/003
See application file for complete search history.

(56) References Cited

U.S. PATENT DOCUMENTS

2002/0065071 A1 *   5/2002   Hunzinger ............ H04W 76/19
                                                              455/452.2
2009/0209237 A1 *   8/2009   Six ..................... H04M 1/72403
                                                              455/414.1
(Continued)

FOREIGN PATENT DOCUMENTS

CN    1691667      11/2005
CN    101242574    8/2008
(Continued)

OTHER PUBLICATIONS

Chinese Office Action for Chinese Application No. 201710457222X dated Dec. 29, 2018, 10 pages.

*Primary Examiner* — Jamal Javaid
*Assistant Examiner* — Ryan C Kavleski
(74) *Attorney, Agent, or Firm* — LOZA & LOZA, LLP; Michael Fedrick

(57) ABSTRACT

Embodiments of the present application disclose a traffic data self-recovery processing method, including: monitoring an operation result of traffic data synchronization operation of a target system; repeatedly performing the traffic data synchronization operation of the target system until the traffic data synchronization is successful or cumulative number of traffic data synchronization failures exceed a failure frequency threshold, if the monitored operation result is that the traffic data synchronization is failed; clearing the (Continued)

cumulative number if the monitored operation result is that the traffic data synchronization is successful; stopping the traffic data synchronization operation of the target system and sending out a message indicative of the traffic data synchronization failure if the cumulative number of traffic data synchronization failures exceeds the failure frequency threshold, wherein the failure frequency threshold is determined by current network signal intensity of the target system and is in a positive correlation with current network signal intensity.

15 Claims, 4 Drawing Sheets

(51) Int. Cl.
*H04L 43/04* (2022.01)
*H04B 17/318* (2015.01)

(56) References Cited

U.S. PATENT DOCUMENTS

2016/0142936 A1* 5/2016 Bressanelli ............. H04L 12/00
 370/242
2017/0230926 A1* 8/2017 Seo ...................... H04J 11/0079

FOREIGN PATENT DOCUMENTS

| CN | 101931633 | 12/2010 |
| CN | 103024672 | 4/2013 |
| CN | 103188647 | 7/2013 |
| CN | 105706492 | 6/2016 |

* cited by examiner

TRAFFIC DATA SELF-RECOVERY PROCESSING METHOD, READABLE STORAGE MEDIUM, SERVER AND APPARATUS

CROSS-REFERENCE TO RELATED APPLICATIONS

The present application is the U.S. national stage of International Patent Application No. PCT/CN2018/077241, filed on Feb. 26, 2018 and entitled TRAFFIC DATA SELF-RECOVERY PROCESSING METHOD, READABLE STORAGE MEDIUM, SERVER AND APPARATUS, which claims the benefit of priority under 35 U.S.C. § 119 from a Chinese patent application filed on Jun. 16, 2017 with the application number of 201710457222.X and entitled "a traffic data self-recovery processing method and a server." The contents of the foregoing applications are incorporated herein by reference in their entirety.

TECHNICAL FIELD

The present application relates to the technical filed of data processing, and particularly to a traffic data self-recovery processing method, a computer readable medium, a server and a traffic data self-recovery processing apparatus.

BACKGROUND

The on-line platform also concerns about the loss of traffic data in on-line service process while providing on-line service. Thus, a platform system needs to perform traffic data calibration on local traffic data based on a telecommunications carrier (e.g., China union communication, China telecom and China mobile), thereby implementing precise traffic data monitoring.

However, in an actual traffic data synchronization operation process, the traffic data synchronization operation may be failed due to various accidental conditions, such as the network environment is not stable, or the platform system is abnormally operated, faults, or the like.

SUMMARY

Embodiments of the present application provide a traffic data self-recovery processing method, a computer readable storage medium, a server and a traffic data self-recovery processing apparatus which aims at solving a problem that the synchronization operation of traffic data may be failed due to various accidental conditions in an actual traffic data synchronization operation process.

In a first aspect, a traffic data self-recovery processing method is provided, which includes: comprising:
  monitoring an operation result of traffic data synchronization operation of a target system;
  repeatedly performing the traffic data synchronization operation of the target system until the traffic data synchronization is successful or cumulative number of traffic data synchronization failures exceed a failure frequency threshold, if the monitored operation result is that the traffic data synchronization is failed;
  clearing the cumulative number if the monitored operation result is that the traffic data synchronization is successful; and
  stopping the traffic data synchronization operation of the target system and sending out a message indicative of the traffic data synchronization failure, if the cumulative number of traffic data synchronization failures exceeds the failure frequency threshold; wherein the failure frequency threshold is determined by current network signal intensity of the target system and is in a positive correlation with current network signal intensity.

In a second aspect, a computer readable storage medium is provided, the computer readable storage medium stores a computer readable instruction, wherein when the computer readable instruction is executed by at least one processor, steps in the aforesaid traffic data self-recovery processing method are implemented.

In a third aspect, a server is provided, the server includes a memory, a processor and a computer readable instruction stored in the memory and executable on the processor, when the processor executes the computer readable instruction, steps in the aforesaid traffic data self-recovery processing method are implemented.

In a fourth aspect, a traffic data self-recovery processing apparatus is provided, including:
  an operation result monitoring module configured to monitor an operation result of traffic data synchronization operation of a target system;
  a repetitive execution module configured to repeatedly perform the traffic data synchronization operation of the target system until the traffic data synchronization is successful or cumulative number of traffic data synchronization failures exceed a failure frequency threshold, if the monitored operation result is that the traffic data synchronization is failed;
  a cumulative number clearing module configured to clear the cumulative number if the monitored operation result is that the traffic data synchronization is successful; and
  a synchronization operation stopping module configured to stop the traffic data synchronization operation of the target system and send out a message indicative of the traffic data synchronization failure, if the cumulative number of traffic data synchronization failures exceeds the failure frequency threshold; wherein the failure frequency threshold is determined by current network signal intensity of the target system and is in a positive correlation with current network signal intensity.

In this embodiment, after traffic data synchronization is failed, data self-recovery processing is performed in the manner of repeatedly executing the traffic data synchronization operation, so that the data synchronization is completed as far as possible, real-time performance of the traffic data synchronization is improved, and the influence of synchronization failure caused by an accidental condition on the target system is reduced.

EMBODIMENTS OF THE PRESENT APPLICATION

Figure 1:
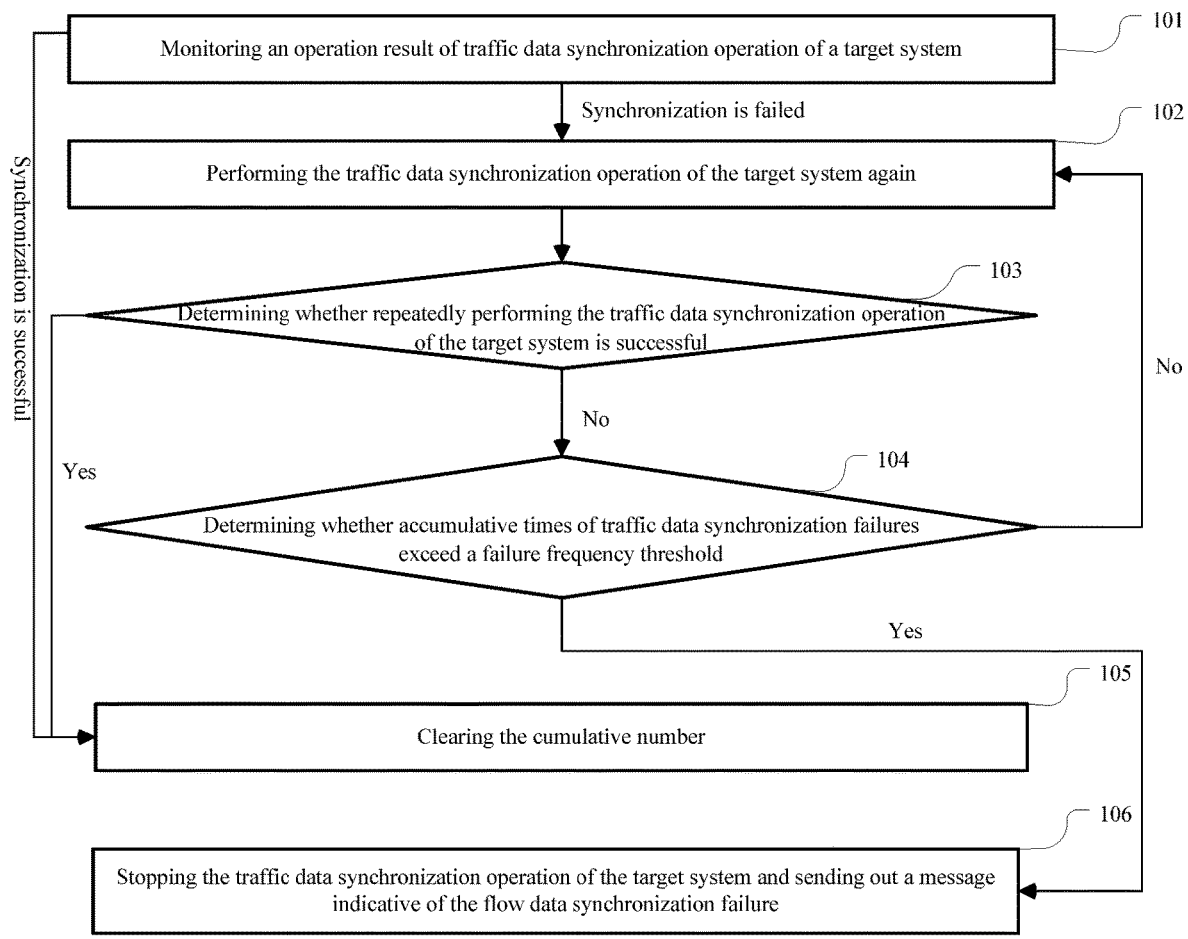
FIG. 1 illustrates a schematic view of an implementation flow chart of a traffic data self-recovery processing method in an embodiment of the present application.

Referring to FIG. 1, an embodiment of the traffic data self-recovery method in the embodiments of the present application includes:

step 101, monitoring an operation result of traffic data synchronization operation of a target system;

In the embodiment, the target system can be a platform system of an on-line platform, the target system can perform traffic data synchronization operation if necessary; for example, a working personnel manually triggers a data synchronization function on the target system, so that the target system performs the synchronization operation; as an alternative, a target system can be preset to perform the traffic data synchronization operation at a certain fixed time of one day, for example, traffic data synchronization and update are performed automatically at 2 o'clock am every day, and the like.

The synchronization operation outputs corresponding operation results after the target system has performed traffic data synchronization operation, strictly speaking, the operation results can be classified into two types, that is, traffic data synchronization is successful and traffic data synchronization is failed, wherein, the traffic data synchronization is failed can include traffic data synchronization operation is failed, synchronization operation is successful but the system fails to acquire traffic data (one of abnormal conditions) of a telecommunications carrier, and the like. Therefore, the result obtained by monitoring the operation result can also include two types, one type is that, the monitored operation result is that the traffic data synchronization is successful; and the other type is that, the monitored operation result is that the traffic data synchronization is failed.

The method can start a thread or a computer program to execute step 101, the step 101 can also be executed by the target system itself, the embodiment of the method does not specifically limit the executive subject of this method.

Figure 2:
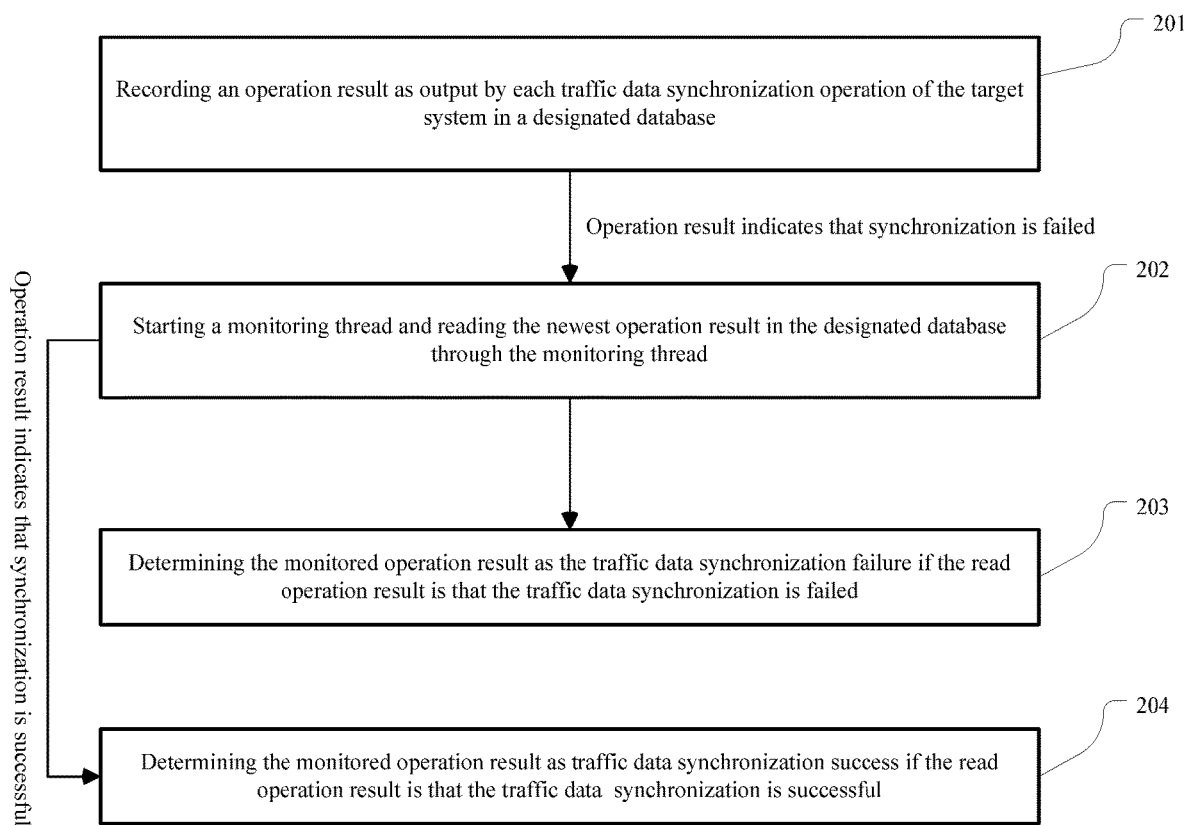
FIG. 2 illustrates a schematic flow chart of step 101 of the traffic data self-recovery processing method in an application scenario in the embodiment of the present application.

Further, as shown in FIG. 2, the step 101 can include:

step 201, recording an operation result as output by each traffic data synchronization operation of the target system into a designated database;

step 202, starting a monitoring thread, and reading the newest operation result in the designated database through the monitoring thread;

step 203, determining the monitored operation result as traffic data synchronization failure if the read operation result is that the traffic data synchronization is failed;

step 204, determining the monitored operation result as the traffic data synchronization success if the read operation result is that the traffic data synchronization is successful.

Regarding steps 201-204, it can be understood that, after each traffic data synchronization operation is performed on the target system, the output operation result can be recorded into the designated database, and the designated database is in data connection with the target system. When needed, a monitoring thread (or a computer program) can be started to read the newest operation result of the target system from the designated database. "The newest operation result" described herein is referred to the operation result which is recorded into the specified database at the latest time, and therefore, the newest operation result is referred to the operation result as output by the target system when performing the traffic data synchronization operation at the latest time.

It can be seen that, if the read operation result is that the traffic data synchronization is failed, it means that, the monitored operation result also indicates that the traffic data synchronization operation is failed; if the read operation result is that the traffic data synchronization is successful, it means that, the monitored operation result also indicates that the traffic data synchronization operation is successful.

In this embodiment, the following steps 102-105 can be performed based on the forgoing monitoring result of step 101.

Step 102, performing the traffic data synchronization operation of the target system again if the operation result is monitored to be that the traffic data synchronization operation is failed;

In this embodiment, when the monitored operation result of the target system is that the traffic data synchronization is failed, in order to improve the real-time performance of traffic data synchronization of the target system, and to make the traffic data of the target system be timely updated, traffic data synchronization operation of the target system is performed again after the synchronization is failed in the step 102, that is, synchronization of traffic data synchronization is attempted to be performed once again.

It can be understood that, repeatedly performing the traffic data synchronization operation in the step 102 and the traffic data synchronization operation performed by the target system itself have the same operation content basically, but have different triggering conditions and purposes. Regarding the traffic data synchronization operation performed by the target system itself, the traffic data synchronization operation is usually a "task" which is required to be processed by the target system at regular intervals or according to received instructions, the triggering condition has been described in the above contents, it is not repeatedly described herein; the purpose is completing the "task" to meet the requirement of traffic data synchronization. On the other hand, regarding performing the traffic data synchronization operation in step 102, a triggering condition is that synchronization operation failure of the target system is monitored, which aims at improving the real-time performance and timeliness of the traffic data synchronization of the target system, thereby facilitating the target system to complete the "task" more quickly. It can be seen that, they have different triggering conditions and different purposes, the step 102 shouldn't be regarded as simply and repeatedly performing the synchronization operation of the target system.

Step 103, determining whether the traffic data synchronization operation of the target system is successfully performed again, if the traffic data synchronization operation of the target system is successfully performed again, executing step 105, if the traffic data synchronization operation of the target system is failed to be performed again, executing step 104;

Step 104, determining whether cumulative number of traffic data synchronization failures exceed a failure frequency threshold or not, if the cumulative number of traffic data synchronization failures doesn't exceed the failure frequency threshold, returning to execute step 102; if the cumulative number of traffic data synchronization failures exceeds the failure frequency threshold, executing step 106.

Regarding the steps 103-104, it can be understood that, in view of a failure result of the previous synchronization operation, there is still a certain possibility of failure when the synchronization operation is performed again in step 102. Therefore, in the embodiment, after the traffic data synchronization operation of the target system is failed each time, the number of synchronization failures will be accumulated, once there is a synchronization failure, the number of cumulative number is added by 1. The target system can perform many traffic data synchronization operations until the traffic data synchronization is successful on the premise that the cumulative number does not exceed the failure frequency threshold.

When the traffic data synchronization operation is successful, the following step 105 is executed; otherwise, if the synchronization fails and the cumulative failure frequency value exceeds the failure frequency threshold, the step 106 should be executed, and the traffic data synchronization operation of the target system is terminated, such that a waste of operation resources of the target system can be avoided.

In this embodiment, the aforesaid failure frequency threshold can be determined by the current network signal intensity of the target system, and is in positive correlation with the current network signal intensity. It can be understood that, when the current network signal intensity of the target system is stronger, the current network state of the target system can be considered to be better, and the synchronization operation can be attempted to be performed for many times, and therefore the failure frequency threshold can be set to be larger; otherwise, when the current network signal intensity is weaker, the current network state of the target system can be considered to be poorer, and the failure frequency threshold can be set to be smaller, the frequency of synchronization operation of the target system is reduced, and the loss of operation resources of the target system is reduced. Particularly, a corresponding relationship between the network signal intensity and the failure frequency threshold can be preset on the target system, and is recorded in the form of a table. For example, the intensity of the network signals is between [−90 dBm and −80 dBm], and the corresponding failure frequency threshold is 3; the network signal intensity is between [−79 dBm, −60 dBm], and the corresponding failure frequency threshold is 5. In addition, as an alternative, the aforesaid failure frequency threshold can also be set according to actual conditions, for example, the failure frequency threshold is set to be 5, that is, when the continuous synchronization failure of the target system reaches 6, step 106 is executed in this embodiment, and the target system stops continuously performing "meaningless" traffic data synchronization operation.

Step 105, clearing the cumulative number.

In this embodiment, it can be understood that, if the operation result of the traffic data synchronization success is monitored, the cumulative number is cleared. Particularly, the triggering step 105 can include the following conditions: the first condition, the monitored result is that the traffic data synchronization is successful in step 101; the second condition, in step 102, after the traffic data synchronization operation of the target system is performed again, the operation result is that the traffic data synchronization is successful; the third condition, when the cumulative number does not exceed the failure frequency threshold, repeatedly triggering the step 102 for many times, and after performing the data synchronization operation of the target system for many times, one of operation results is that the traffic data synchronization is successful.

It can be seen from the contents described above that, since operation results of traffic data synchronization operations performed by the target system each time can be monitored, no matter whether the synchronization operation of the traffic data is performed by the target system or performed by triggering the step 102, operation results of the traffic data synchronization operations can still be considered to be monitored by a monitoring procedure in step 101, and a corresponding monitoring result is obtained.

Step 106, stopping the traffic data synchronization operation of the target system and sending out a message indicates that the traffic data synchronization operation is failed.

In this embodiment, if the cumulative number of the traffic data synchronization failures exceeds the failure frequency threshold, the traffic data synchronization operation of the target system can be stopped, and the message indicative of the traffic data synchronization failure can be sent out. The "stopping the traffic data synchronization operation of the target system" described herein refers to stop the current synchronization operation thread or the task of the target system. It can be understood that, when the target system receives new traffic data synchronization instruction or task again, the target system can start the traffic data synchronization function again and perform synchronization operation.

Regarding the step 106, when the cumulative number of synchronization failures exceeds the failure frequency threshold, the target system can be considered to be incapable of completing synchronization of the current traffic data in short time, therefore, the traffic data synchronization operation of the target system is stopped. In addition, in order to check why the target system cannot complete the synchronization operation as soon as possible, the message indicative of the traffic data synchronization failure should be sent out, such that a relevant working personnel can detect timely, which provides assistance for the working personnel to perform a system maintenance. Wherein, sending out the information about the traffic data synchronization failure can include: notifying a designated working personnel via message, email, system message; and directly displaying the message about the traffic data synchronization failure on a display screen of the target system to be reviewed by the designated working personnel; it is still possible to alarm in a manner of voice broadcast, or in a manner of indicator lamp flashing, or the like, such that the designated working personnel can be notified in time, and alertness of the working personnel is caused.

In this embodiment, except for implementing self-recovery of the target system in the manner of repeatedly attempting to perform the synchronization operations in steps 102-104, in order to further improve the self-recovery function of the traffic flow of the target system, this method can make an intelligent judgment and perform self-recovery processing according to the network state connected with the target system, so that the synchronization operation of the traffic data can be performed again when the network state of the target system is the best, and a success rate of synchronization operation is improved.

Figure 3:
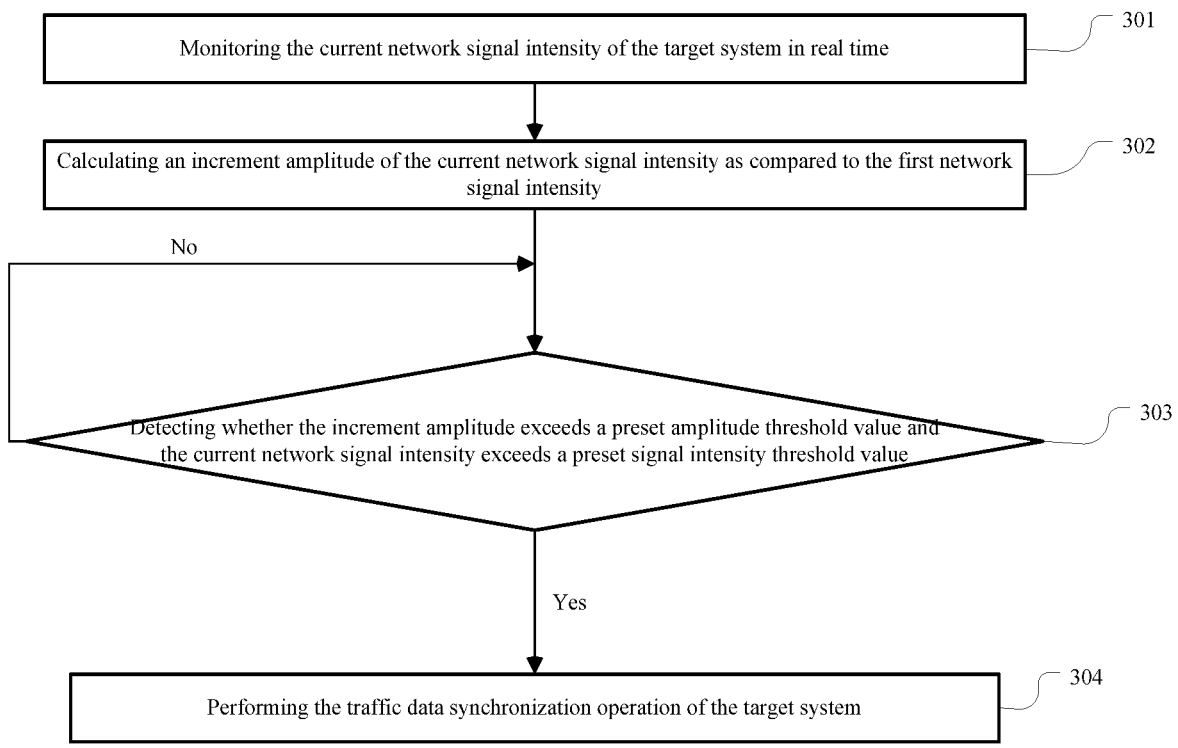
FIG. 3 illustrates a schematic flow chart of a traffic data self-recovery processing method in an application scenario after stopping synchronization operation in an embodiment of the present application.

It should be noted that, in this embodiment, preferably, every time when the monitored operation result is that the traffic data synchronization is failed, the first network signal intensity of the target system at the moment of synchronous failure is recorded. On this basis, as shown in FIG. 3, after a traffic data synchronization operation of the target system is stopped in step 106, the traffic data self-recovery processing method in this embodiment can further include:

step 301, monitoring the current network signal intensity of the target system in real time;

step 302, calculating an increment amplitude of the current network signal intensity as compared to the first network signal intensity;

step 303, detecting whether the increment amplitude exceeds a preset amplitude threshold and the current network signal intensity exceeds a preset signal intensity threshold, if the increment amplitude exceeds the preset amplitude threshold and the current network signal intensity exceeds the preset signal intensity threshold, executing step 304, otherwise, continuing to perform detection;

step 304, performing the traffic data synchronization operation of the target system.

In this embodiment, after the traffic data synchronization operation of the target system at step 106 is stopped, considering that the problem of synchronization operation failure may be due to poorer network quality of the target system, thus, the synchronous operation can be performed again under the condition that the network quality is obviously improved, so that the self-recovery of the traffic data synchronization can be completed without a manual intervention. Therefore, regarding the step 301, the current network signal intensity of the target system needs to be detected in real time.

Regarding the step 302, after the current network signal intensity of the target system is monitored, the increment amplitude of the current network signal intensity of the target system as compared to the network signal intensity of the target system at the moment of synchronization failure needs to be calculated, that is, the comparison between the current network signal intensity and the first network signal intensity. Particularly, the difference between them can be calculated to serve as the increment amplitude; for example, assuming that the current network signal intensity is A, the first network signal intensity is B, the increment amplitude calculated in the step 302 is (A-B); in addition, a growth rate between the current network signal intensity and the first network signal intensity can also be calculated as the increment amplitude; for example, assuming that the current network signal intensity is A, the first network signal intensity is B, the increment amplitude obtained in step 302 is (A-B)/B. It can be understood that, the increment amplitude in the embodiment is used for representing an improvement degree of the current network signal intensity as compared to the first network signal intensity; as a result, any calculation method and calculation value which may represent the improvement degree between them can be considered as another expression form of the increment amplitude.

Regarding step 303, in order to accurately judge whether the current network quality of the target system is remarkably improved, requirements of two aspects are set in this embodiment; in the first aspect, the increase amplitude calculated in step 302 is larger than a preset amplitude threshold; in a second aspect, the current network signal intensity obtained by monitoring in step 301 needs to exceed a preset signal intensity threshold, the current network quality of the target system can be considered as remarkably improved only when the requirements of the two aspects are met at the same time. Therefore, if the detection result of the step 303 is yes, the step 304 is executed; otherwise, the detection is continuously performed.

Figure 4:
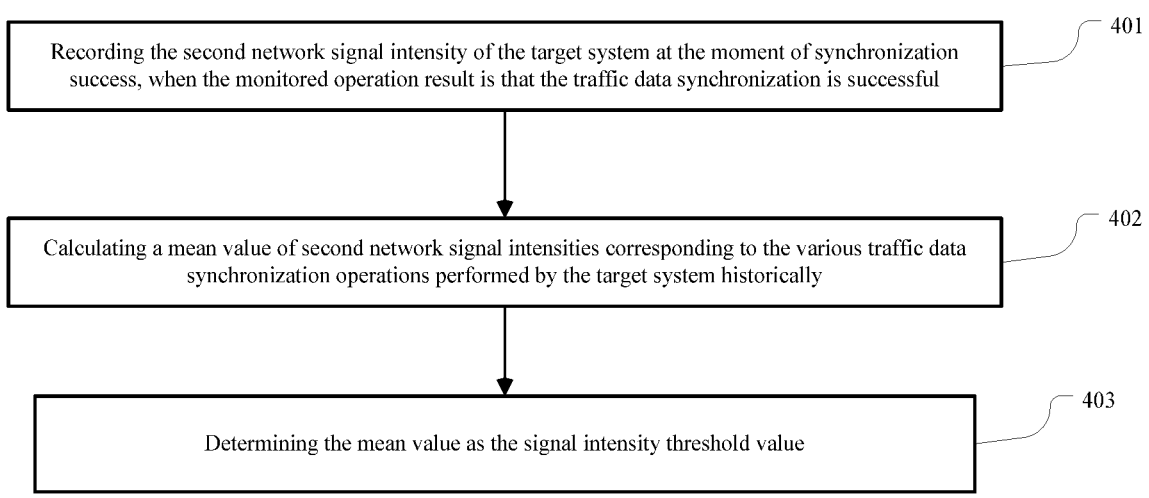
FIG. 4 illustrates a schematic flow chart of presetting signal intensity threshold in the traffic data self-recovery processing method of a corresponding embodiment of the present application.

In addition, the signal intensity threshold in the step 303 can be preset according to actual use conditions, such as by the working personnel in advance. In order to enable the setting of the signal intensity threshold be more reasonable, further, as shown in FIG. 4, the signal intensity threshold in the step 303 can be preset through the following steps:

Step 401, recording the second network signal intensity of the target system at the moment of synchronization success, when the monitored operation result is that the traffic data synchronization is successful;

step 402, calculating a mean value of second network signal intensities corresponding to the various traffic data synchronization operations performed by the target system historically;

step 403, determining the mean value as the signal intensity threshold.

Regarding the aforesaid steps 401 to 403, it can be understood that, the signal intensity threshold is used for evaluating whether the current network signal intensity is capable of providing a network environment where the target system can perform traffic data synchronization operation normally. Therefore, the setting of the signal intensity threshold can be determined by referring to the network signal intensities in the historical synchronization operation process of the target system. In this embodiment, every time when the target system is successfully synchronized, the system actively records the second network signal intensity at the time when synchronization is successfully performed, then, after the system has been used for a period of time, the system (which can be the target system) can store a large amount of second network signal intensities corresponding to the historical synchronization operations which are successfully performed.

Regarding steps 402 and 403, after recording the intensities of the second network signals, the mean value of the second network signal intensities can be calculated to serve as the signal intensity threshold. It can be understood that, since these second network signal intensities are the corresponding network signal intensities when the historical synchronization operation of the target system are successfully performed, when the current network signal intensity exceeds the mean value thereof, it means that the current network signal intensity is better than the average network environment where the previous synchronization operations of the target system lies in, so that the current network environment of the target system can be considered to meet the requirements of normal traffic data synchronization operation.

Regarding step 304, the traffic data synchronization operation of the target system can be performed if the increment amplitude exceeds the preset amplitude threshold and the current network signal intensity exceeds a preset signal intensity threshold.

In this embodiment, furthermore, in order to make the target system be more intelligent and automated, after the traffic data synchronization operation of the target system in the step 106 is stopped, the traffic data self-recovery processing method can also detect whether the system time of the target system reaches a specified time; if the system time of the target system reaches the specified time, the traffic data synchronization operation of the target system is performed. It can be understood that, in this embodiment, after the synchronization operation has been attempted to be performed for many times but fails, and the traffic data synchronization operation of the target system is stopped, except for triggering a self-recovery function of the traffic data synchronization of the target system by detecting whether the current network quality is obviously improved, in this embodiment, the target system can also be triggered to perform traffic data synchronization operation at regular time, thereby attempting to perform self-recovery at regular time, which can compensate the disadvantage of the self-recovery by performing network quality detection to a certain extent.

In this embodiment, after traffic data synchronization is failed, data self-recovery processing is performed in the manner of repeatedly executing the traffic data synchronization operation, so that the data synchronization is completed as far as possible, and real-time performance of the traffic data synchronization is improved, and the influence of synchronization failure caused by an accidental condition on the target system is reduced.

It should be understood that, the value of serial number of the various steps in the aforesaid embodiment doesn't mean a sequencing of execution sequences of the steps, the execution sequence of each of the steps should be determined by functionalities and internal logics of the steps themselves, and shouldn't be regarded as limitation to an implementation process of the embodiment of the present application.

Figure 5:
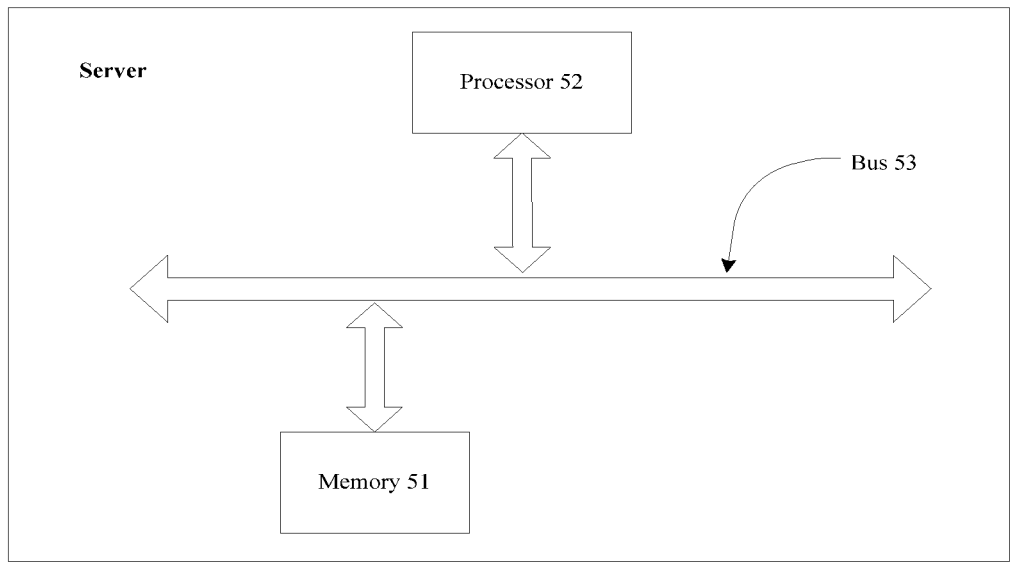
FIG. 5 illustrates a schematic view of an operating environment of the computer readable instruction provided by an embodiment of the present application.

FIG. 5 illustrates a schematic view of operating environment of a computer readable instruction provided by the embodiment of the present application, in this embodiment, the computer readable instruction is installed and operated in a server 5. The server 5 can be a computing device such as a desk computer, a notebook, a palm, a cloud server, etc. The server 5 can include but is not limited to, one or a plurality of memories (only one memory is shown in the figure), one or a plurality of processor(s) 52 (only one processor is shown in the figure), the memory 51 and the processor 52 are connected via bus 53.

Figure 6:
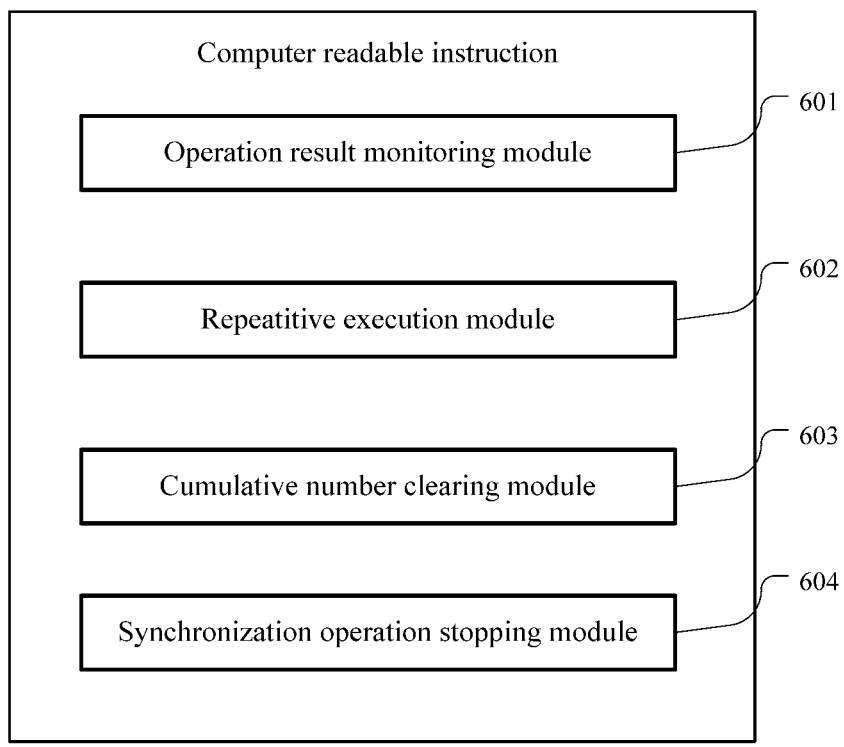
FIG. 6 illustrates a block diagram of functional modules of a computer readable instruction provided by an embodiment of the present application.

Please refer to FIG. 6, FIG. 6 is a block diagram of functional modules of the computer readable instruction provided by an embodiment of the present application. In this embodiment, said computer readable instruction can be divided into one or a plurality of module(s), said one or a plurality of module(s) is/are stored in a computer readable storage medium such as the memory 51, and is/are executed by one the one or a plurality of processor(s) so as to implement the present application. For example, as shown in FIG. 6, the computer readable instruction can be divided into an operation result monitoring module 601, a repetitive execution module 602, a cumulative number clearing module 603 and a synchronization operation stopping module 604. The functionalities of the modules 601-604 will be described in detail as follows:

the operation result monitoring module 601 is configured to monitor an operation result of traffic data synchronization operation of a target system;

a repetitive execution module 602 is configured to repeatedly perform the traffic data synchronization operation of the target system until the traffic data synchronization is successful or cumulative number of traffic data synchronization failures exceed a failure frequency threshold, if the monitored operation result is that the traffic data synchronization is failed;

a cumulative number clearing module 603 is configured to clear the cumulative number if the monitored operation result is that the traffic data synchronization is successful; and a synchronization operation stopping module 604 is configured to stop the traffic data synchronization operation of the target system and send out a message indicative of the traffic data synchronization failure, if the cumulative number of traffic data synchronization failures exceeds the failure frequency threshold;

wherein the failure frequency threshold is determined by current network signal intensity of the target system and is in a positive correlation with current network signal intensity.

Further, the computer readable instruction further includes:

a first signal intensity recording module configured to record a first network signal intensity of the target system at the moment of synchronization failure, when the monitored operation result is that the traffic data synchronization is failed;

after stopping the traffic data synchronization operation of the target system, the computer readable instruction can further include:

a signal intensity detection module configured to monitor the current network signal intensity of the target system in real time;

an increment amplitude calculation module configured to calculate an increment amplitude of the current network signal intensity as compared to the first network signal intensity; and a synchronization operation execution module configured to perform the traffic data synchronization operation of the target system if the increment amplitude exceeds a preset amplitude threshold and the current network signal intensity exceeds a preset signal intensity threshold.

Furthermore, the signal intensity threshold can be preset according to the modules in the following:

a second signal intensity recording module configured to record the second network signal intensity of the target system at the time when the traffic data synchronization operation is successful, when the monitored operation result is that the traffic data synchronization is successful;

an intensity mean value calculation module configured to calculate a mean value of second network signal intensities corresponding to the various traffic data synchronization operations performed by the target system historically; and an intensity threshold determination module configured to determine the mean value as the signal intensity threshold.

Furthermore, after the traffic data synchronization operation of the target system is stopped, the computer readable instruction further includes:

a time detection module configured to detect whether system time of the target system reaches a specified time; and an operation execution module configured to perform the traffic data synchronization operation of the target system if the system time of the target system reaches the specified time.

Further, the operation result monitoring module 601 can include:

an output result recording unit configured to record an operation result as output by each traffic data synchronization operation of the target system into a designated database;

an operation result reading unit configured to start a monitoring thread and read the newest operation result in the designated database through the monitoring thread;

a first determination unit configured to determine the monitored operation result as the traffic data synchronization failure if the read operation result is that the traffic data synchronization is failed; and a second determination unit configured to determine the monitored operation result as the traffic data synchronization success, if the read operation result is that the traffic data synchronization is successful.

What is claimed is:

1. A traffic data self-recovery processing method, comprising:
monitoring an operation result of traffic data synchronization operation of a target system;
repeatedly performing the traffic data synchronization operation of the target system until the traffic data synchronization is successful or cumulative number of traffic data synchronization failures exceeds a failure frequency threshold, if a monitored operation result is that the traffic data synchronization is failed;
clearing the cumulative number if the monitored operation result is that the traffic data synchronization is successful;
stopping the traffic data synchronization operation of the target system and sending out a message indicative of the traffic data synchronization failure, if the cumulative number of traffic data synchronization failures exceeds the failure frequency threshold, wherein the failure frequency threshold is determined by current network signal intensity of the target system and is in a positive correlation with current network signal intensity;
recording a first network signal intensity of the target system at the moment of synchronization failure, when the monitored operation result is that the traffic data synchronization is failed; and
after stopping the traffic data synchronization operation of the target system, performing the following further steps:
monitoring the current network signal intensity of the target system in real time;
calculating an increment amplitude of the current network signal intensity as compared to the first network signal intensity; and
performing the traffic data synchronization operation of the target system if the increment amplitude exceeds a preset amplitude threshold and the current network signal intensity exceeds a preset signal intensity threshold.

2. The traffic data self-recovery processing method according to claim 1, wherein monitoring an operation result of the traffic data synchronization operation of the target system comprises:
recording an operation result as output by each traffic data synchronization operation of the target system into a designated database;
starting a monitoring thread and reading the newest operation result in the designated database through the monitoring thread;
determining the monitored operation result as the traffic data synchronization failure if the read operation result is that the traffic data synchronization is failed; and
determining the monitored operation result as traffic data synchronization success if the read operation result is that the traffic data synchronization is successful.

3. The traffic data self-recovery processing method according to claim 1, wherein the signal intensity threshold is preset according to following steps:
recording the second network signal intensity of the target system at the moment of synchronization success, when the monitored operation result is that the traffic data synchronization is successful;
calculating a mean value of second network signal intensities corresponding to the various traffic data synchronization operations performed by the target system historically; and
determining the mean value as the signal intensity threshold.

4. The traffic data self-recovery processing method according to claim 3, wherein monitoring an operation result of the traffic data synchronization operation of the target system comprises:
recording an operation result as output by each traffic data synchronization operation of the target system into a designated database;
starting a monitoring thread and reading the newest operation result in the designated database through the monitoring thread;
determining the monitored operation result as the traffic data synchronization failure if the read operation result is that the traffic data synchronization is failed; and
determining the monitored operation result as traffic data synchronization success if the read operation result is that the traffic data synchronization is successful.

5. The traffic data self-recovery processing method according to claim 1, wherein after stopping the traffic data synchronization operation of the target system, the traffic data self-recovery processing method further comprises:
detecting whether system time of the target system reaches a specified time; and
performing the traffic data synchronization operation of the target system if the system time of the target system reaches the specified time.

6. The traffic data self-recovery processing method according to claim 5, wherein the monitoring an operation result of the traffic data synchronization operation of the target system comprises:
recording an operation result as output by each traffic data synchronization operation of the target system into a designated database;
starting a monitoring thread and reading the newest operation result in the designated database through the monitoring thread;
determining the monitored operation result as the traffic data synchronization failure if the read operation result is that the traffic data synchronization is failed; and
determining the monitored operation result as traffic data synchronization success if the read operation result is that the traffic data synchronization is successful.

7. The traffic data self-recovery processing method according to claim 1, wherein the step of monitoring an operation result of the traffic data synchronization operation of the target system comprises:
recording an operation result as output by each traffic data synchronization operation of the target system into a designated database;
starting a monitoring thread and reading the newest operation result in the designated database through the monitoring thread;
determining the monitored operation result as the traffic data synchronization failure if the read operation result is that the traffic data synchronization is failed; and
determining the monitored operation result as traffic data synchronization success if the read operation result is that the traffic data synchronization is successful.

8. A non-transitory computer readable storage medium which stores a computer readable instruction, wherein when the computer readable instruction is executed by at least one processor, the at least one processor implements following steps of:

monitoring an operation result of traffic data synchronization operation of a target system;

repeatedly performing the traffic data synchronization operation of the target system until the traffic data synchronization is successful or cumulative number of traffic data synchronization failures exceeds a failure frequency threshold, if the monitored operation result is that the traffic data synchronization is failed;

clearing the cumulative number if the monitored operation result is that the traffic data synchronization is successful;

stopping the traffic data synchronization operation of the target system and sending out a message indicative of the traffic data synchronization failure, if the cumulative number of traffic data synchronization failures exceeds the failure frequency threshold wherein the failure frequency threshold is determined by current network signal intensity of the target system and is in a positive correlation with current network signal intensity;

recording a first network signal intensity of the target system at the moment of synchronization failure, when the monitored operation result is that the traffic data synchronization is failed; and after stopping the traffic data synchronization operation of the target system, implementing the following further steps:

monitoring the current network signal intensity of the target system in real time;

calculating an increment amplitude of the current network signal intensity as compared to the first network signal intensity; and performing the traffic data synchronization operation of the target system if the increment amplitude exceeds a preset amplitude threshold and the current network signal intensity exceeds a preset signal intensity threshold.

9. The non-transitory computer readable storage medium according to claim 8, wherein the signal intensity threshold is preset according to following steps:

recording the second network signal intensity of the target system at the moment of synchronization success, when the monitored operation result is that the traffic data synchronization is successful;

calculating a mean value of second network signal intensities corresponding to the various traffic data synchronization operations performed by the target system historically; and determining the mean value as the signal intensity threshold.

10. The non-transitory computer readable storage medium according to claim 8, wherein after stopping performing the traffic data synchronization operation of the target system, the at least one processor implements the following further steps:

detecting whether system time of the target system reaches a specified time; and performing the traffic data synchronization operation of the target system if the system time of the target system reaches the specified time.

11. The non-transitory computer readable storage medium according to claim 8, wherein the step of monitoring an operation result of the traffic data synchronization operation of the target system comprises:

recording an operation result as output by each traffic data synchronization operation of the target system into a designated database;

starting a monitoring thread and reading the newest operation result in the designated database through the monitoring thread;

determining the monitored operation result as the traffic data synchronization failure if the read operation result is that the traffic data synchronization is failed; and determining the monitored operation result as traffic data synchronization success if the read operation result is that the traffic data synchronization is successful.

12. A server comprising a memory, a processor and a computer readable instruction stored in the memory and executable by the processor, wherein when executing the computer readable instruction, the processor implements following steps of:

monitoring an operation result of traffic data synchronization operation of a target system;

repeatedly performing the traffic data synchronization operation of the target system until the traffic data synchronization is successful or cumulative number of traffic data synchronization failures exceeds a failure frequency threshold, if the monitored operation result is that the traffic data synchronization is failed;

clearing the cumulative number if the monitored operation result is that the traffic data synchronization is successful;

stopping the traffic data synchronization operation of the target system and sending out a message indicative of the traffic data synchronization failure, if the cumulative number of traffic data synchronization failures exceeds the failure frequency threshold, wherein the failure frequency threshold is determined by current network signal intensity of the target system and is in a positive correlation with current network signal intensity;

recording a first network signal intensity of the target system at the moment of synchronization failure, when the monitored operation result is that the traffic data synchronization is failed; and after stopping the traffic data synchronization operation of the target system, performing the following further steps:

monitoring the current network signal intensity of the target system in real time;

calculating an increment amplitude of the current network signal intensity as compared to the first network signal intensity; and performing the traffic data synchronization operation of the target system if the increment amplitude exceeds a preset amplitude threshold and the current network signal intensity exceeds a preset signal intensity threshold.

13. The server according to claim 12, wherein the signal intensity threshold is preset according to following steps:

recording the second network signal intensity of the target system at the moment of synchronization success, when the monitored operation result is that the traffic data synchronization is successful;

calculating a mean value of second network signal intensities corresponding to the various traffic data synchronization operations performed by the target system historically; and determining the mean value as the signal intensity threshold.

14. The server according to claim 12, wherein after stopping the traffic data synchronization operation of the target system, the method further comprises:
- detecting whether system time of the target system reaches a specified time; and
- performing the traffic data synchronization operation of the target system if the system time of the target system reaches the specified time.

15. The server according to claim 12, wherein monitoring an operation result of the traffic data synchronization operation of the target system comprises:
- recording an operation result as output by each traffic data synchronization operation of the target system into a designated database;
- starting a monitoring thread and reading the newest operation result in the designated database through the monitoring thread;
- determining the monitored operation result as the traffic data synchronization failure if the read operation result is that the traffic data synchronization is failed; and
- determining the monitored operation result as traffic data synchronization success if the read operation result is that the traffic data synchronization is successful.

\* \* \* \* \*